(12) United States Patent
Fasoula

(10) Patent No.: US 12,524,876 B2
(45) Date of Patent: Jan. 13, 2026

(54) MEDICAL DEVICE AND METHOD FOR PROCESSING MICROWAVE MEDICAL IMAGES BY MEANS OF DESCRIPTORS OF 3D SHAPE AND OF TEXTURE CHARACTERISTICS IN ORDER TO CHARACTERIZE LESIONS IN IMAGED TISSUES

(71) Applicant: MVG Industries, Villejust (FR)

(72) Inventor: Agathi Fasoula, Villejust (FR)

(73) Assignee: MVG Industries (FR)

( * ) Notice: Subject to any disclaimer, the term of this patent is extended or adjusted under 35 U.S.C. 154(b) by 285 days.

(21) Appl. No.: 18/289,429

(22) PCT Filed: May 4, 2022

(86) PCT No.: PCT/FR2022/050864
§ 371 (c)(1),
(2) Date: Nov. 3, 2023

(87) PCT Pub. No.: WO2022/234234
PCT Pub. Date: Nov. 10, 2022

(65) Prior Publication Data
US 2024/0412353 A1    Dec. 12, 2024

(30) Foreign Application Priority Data

May 4, 2021  (FR) ..................................... 2104691

(51) Int. Cl.
*G06V 10/25*    (2022.01)
*G06T 7/00*    (2017.01)
(Continued)

(52) U.S. Cl.
CPC .............. *G06T 7/0012* (2013.01); *G06T 7/50* (2017.01); *G06V 10/25* (2022.01); *G06V 10/54* (2022.01);
(Continued)

(58) Field of Classification Search
CPC ..................... G06T 7/0012; G06T 7/50; G06T 2207/30068; G06T 2207/30096;
(Continued)

(56) References Cited

U.S. PATENT DOCUMENTS 5,829,437 A * 11/1998 Bridges .................. A61B 6/502
600/407
2004/0097811 A1 * 5/2004 Smith .................. A61B 5/4312
600/448

OTHER PUBLICATIONS

Natalia K. Nikolova: "Microwave Imaging for Breast Cancer", Nov. 15, 2011, pp. 1-17. (Year: 2011).*

(Continued)

*Primary Examiner* — Siamak Harandi
(74) *Attorney, Agent, or Firm* — Lerner David LLP

(57) ABSTRACT

The invention relates to a method for processing medical images of human tissues of a zone of the body of a patient and in particular of the breast by means of a microwave medical imaging device, the method comprising the following steps implemented in a processing unit of the medical imaging device:—identifying at least one region of interest using at least one initial microwave image of a zone of the body of a patient;—processing each region of interest identified in an image so as: o to determine at least a first shape characteristic, preferably the solidity of each region of interest; o to determine at least a second and third characteristics relative to the texture of each region of interest; the first, second and third characteristics being coordinates characterising each region of interest;—locating, in a space of at least three dimensions, the dimensions of which are at least the first, second and third characteristic, respectively, each region of interest based on its coordinates, the space being partitioned by a decision hypersurface into two continuous and separate sub-spaces, one sub-space such that a region of interest located therein is associated with a benign (Continued)

lesion, and another sub-space such that a region of interest located therein is associated with a malignant lesion.

10 Claims, 6 Drawing Sheets

(51) Int. Cl.
　　*G06T 7/50*　　　(2017.01)
　　*G06V 10/54*　　(2022.01)
　　*G06V 10/764*　(2022.01)
(52) U.S. Cl.
　　CPC .. *G06V 10/764* (2022.01); *G06T 2207/30068* (2013.01); *G06T 2207/30096* (2013.01)
(58) Field of Classification Search
　　CPC ...... G06V 10/25; G06V 10/54; G06V 10/764; G06V 20/698; G06V 20/695; G06V 2201/03
　　See application file for complete search history.

(56) References Cited

OTHER PUBLICATIONS

Zacharaki, E.I. et al., "Classification of brain tumor type and grade using MRI texture and shape in a machine learning scheme", Magnetic Resonance in Medicine, vol. 62, No. 6, Oct. 26, 2009, pp. 1609-1618, XP055156156.

O'Loughlin, D. et al., "Microwave Breast Imaging: Clinical Advances and Remaining Challenges", IEEE Transactions on Biomedical Engineering, vol. 65, No. 11, Nov. 2018, pp. 2580-2590, XP011691960.

Lazebnik, M. et al., "A large-scale study of the ultrawideband microwave dielectric properties of normal, benign and malignant breast tissues obtained from cancer surgeries", Phys. Mecl. Bioi. 52 (Oct. 1, 2007), pp. 6093-6115, XP002804950.

International Search Report for Application No. PCT/FR2022/050864 mailed Aug. 26, 2022, pp. 1-3.

French Search Report for Application No. FR 2104691 dated Dec. 6, 2021, 3 pages. [See p. 3, categorizing the cited references].

* cited by examiner

Pcfib : [20:50]%

Pcfib : [10:60]%

Pcfib : [50:60]%

Pcfib : [30:40]%

Pcfib : [10:20]%

MEDICAL DEVICE AND METHOD FOR PROCESSING MICROWAVE MEDICAL IMAGES BY MEANS OF DESCRIPTORS OF 3D SHAPE AND OF TEXTURE CHARACTERISTICS IN ORDER TO CHARACTERIZE LESIONS IN IMAGED TISSUES

CROSS-REFERENCE TO RELATED APPLICATIONS

The present application is a national phase entry under 35 U.S.C § 371 of International Application No. PCT/FR2022/050864 filed May 4, 2022, which claims priority from French Application No. 2104691 filed May 4, 2021, all of which are hereby incorporated herein by reference.

TECHNICAL FIELD

The invention relates to the field of medical imaging using electromagnetic waves in the microwave frequency band and relates, more particularly, to medical imaging for analysis of human tissues or organs that are permeable to electromagnetic waves. The invention has application, in particular, in breast imaging and the detection of mammary pathologies.

PRIOR ART

Microwave imaging techniques enable imaging of human organs that are permeable to electromagnetic waves and are promising techniques in the field of breast imaging and the detection of pathologies such as breast cancer.

Microwave imaging uses emission probes configured to illuminate all or part of the organ to be imaged by means of electromagnetic waves The emitted waves pass through the zone to be imaged and are received by receiving probes. The probes can be configured in a complementary manner in order to simultaneously emit and receive. The received waves have passed through the zone to be imaged having undergone reflections on the obstacles encountered, at locations of dielectric contrast (for example a cancerous lesion located in the breast tissue). The set of transmission coefficients thus measured between the emitting probes and the receiving probes enable a microwave image to be reconstructed of the zone of the organ in which regions of interest can be seen, which may correspond to lesions.

The quality of the processing of reconstructed images is of paramount importance in order to guarantee the most reliable possible detection of lesions.

DISCLOSURE OF THE INVENTION

The intervention addresses the need to improve the quality of processing of microwave images.

For this purpose, the invention proposes, according to a first aspect, a method for processing medical images of human tissues from a zone of the body of a patient and, in particular, the breast, by means of a microwave medical imaging device, the method comprising the following steps implemented in a processing unit of the medical imaging device:
  identifying at least one region of interest from at least one initial microwave image of a zone of the body of a patient;
  processing each region of interest identified on an image in such a way as to:
    determine at least one first shape characteristic, preferably the solidity of each region of interest;
    determine at least one second and third characteristic relating to the texture of each region of interest; the first, second and third characteristics being coordinates characterising each region of interest;
  locating, in a space with at least three dimensions, for which the dimensions are respectively at least the first, second and third characteristic, of each region of interest from its coordinates, the space being partitioned by a decision hypersurface into two continuous and separate sub-spaces, one sub-space such that a region of interest located therein is associated with a benign lesion, and another sub-space such that a region of interest located therein is associated with a malignant lesion.

The invention is advantageously supplemented by the following features, taken individually or in any of the possible technical combinations thereof:
  the method comprises determining a classification score for each region of interest, said score corresponding to a probability of malignancy being the a posteriori probability for the region of interest belonging to the class of malignant lesions;
  a region of interest is associated with a benign lesion if the probability of malignancy is less than or equal to 50% and is associated with a malignant lesion if the probability of malignancy is greater than 50%;
  the second characteristic is a measurement of the spatial relationship between the intensity of the pixels the region of interest in specific directions;
  the third characteristic is a measurement of the spatial relationship between the intensity of three or more groups of neighbouring pixels of the region of interest;
  a decision surface is obtained by means of a naive Bayes classifier or by means of a quadratic discriminant analysis classifier, trained beforehand on training regions of interest;
  the method comprises a processing step of each region of interest so as to refine the contour of each region of interest;
  the method comprises a step of obtaining at least one initial image of the zone to be imaged and a step of morphological processing of each initial image in order to identify the regions of interest;
  the method comprises a step of validating the regions of interest by evaluating the persistence of the regions of interest over a plurality of morphological images.

The invention proposes, according to a second aspect, a computer program product comprising program code instructions for executing the method steps according to the first aspect of the invention, when this method is executed by at least one processor.

The invention proposes, according to a third aspect, a medical imaging device comprising a processing unit configured to implement a method according to the first aspect of the invention.

The invention makes it possible to separate, in the microwave images of a zone of tissue, the benign-type lesions and malignant lesions.

This separation is made possible by the combination of characteristics based on the shape and on the texture with application to microwave imaging.

The invention is based on a limited number of characteristics including at least one shape extractor (in particular the solidity) and two texture characteristics (in particular, the correlation and busyness) applied to the regions of interest identified on the microwave images.

In addition, the invention takes advantage of a low dimensionality space: a limited number of characteristics is extracted, on the order of three to five for example, in connection with the limited number of data available, but also in order to better understand the underlying physical phenomena (the shape (at least one) and heterogeneity (at least two) of the region of interest). Considering the low number of characteristics, their choice is crucial and the combination of different characteristics used in the invention makes it possible to improve the image processing.

DESCRIPTION OF THE FIGURES

Other features, aims and advantages of the invention will emerge from the following description, which is given purely by way of illustration and not being limiting and which should be read with reference to the attached drawings, in which.

In all the figures, similar elements have identical reference signs.

DETAILED DESCRIPTION

Figure 1:
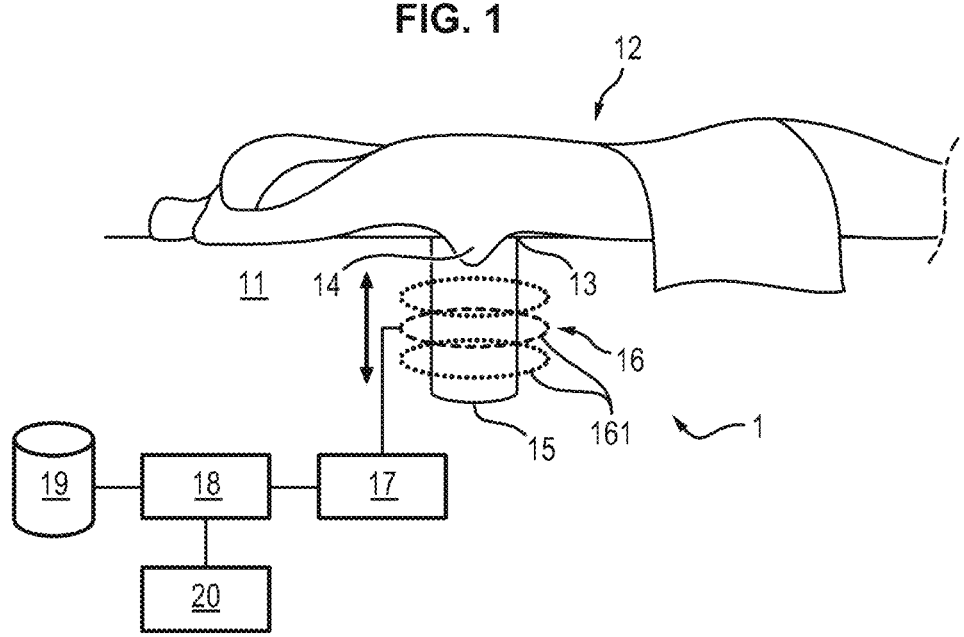
FIG. 1 schematically shows a microwave medical imaging system according to an embodiment of the invention.
Figure 2:
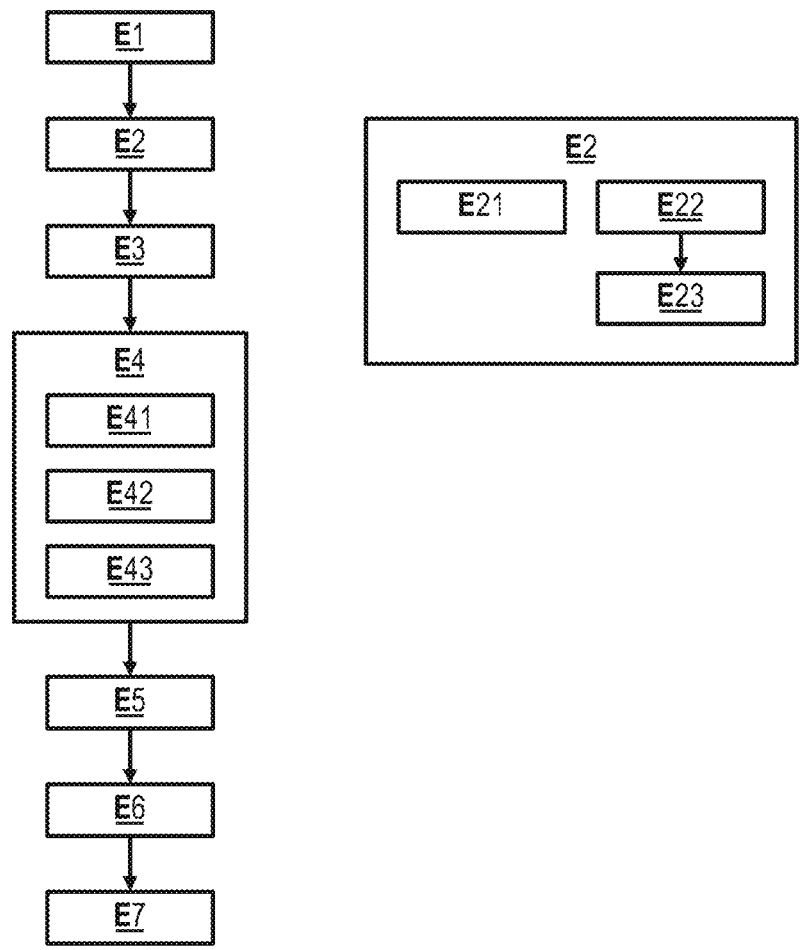
FIG. 2 shows the steps of a method for processing regions of interest of 3D microwave images according to the invention.
Figure 3B:
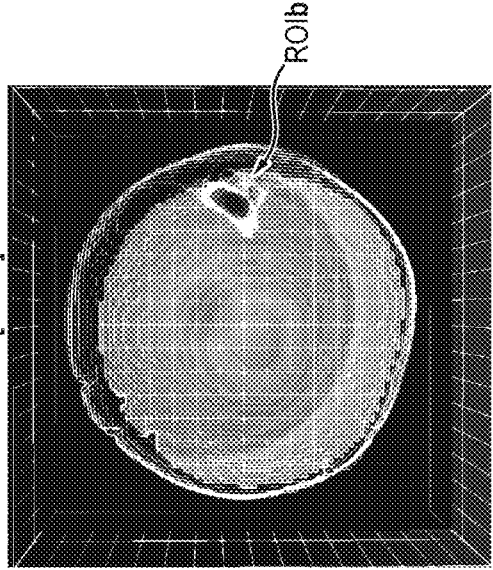
FIG. 3a, FIG. 3b, FIG. 3c, FIG. 3d, FIG. 3e show 3D microwave images of the breast on which the regions of interest are identified and serving as input data to the processing method according to the invention.
Figure 3A:
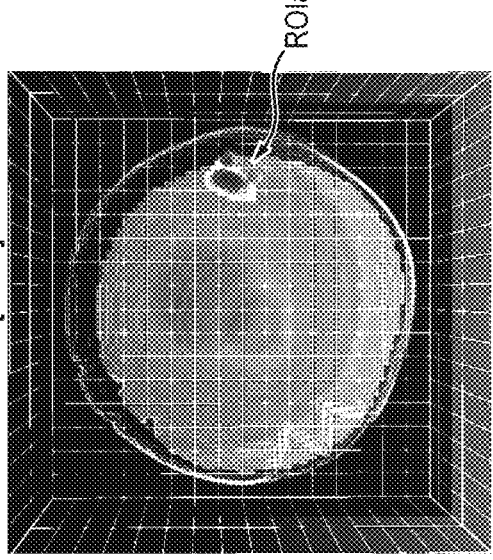
Figure 3E:
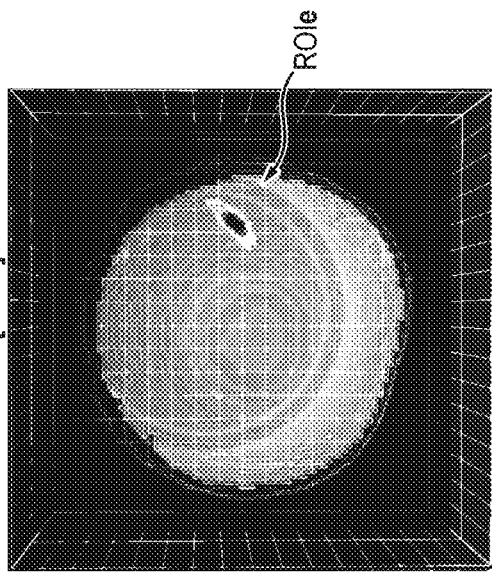
Figure 3D:
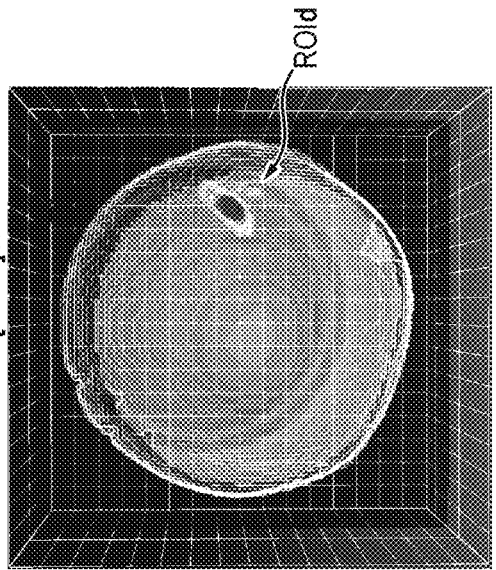
Figure 3C:
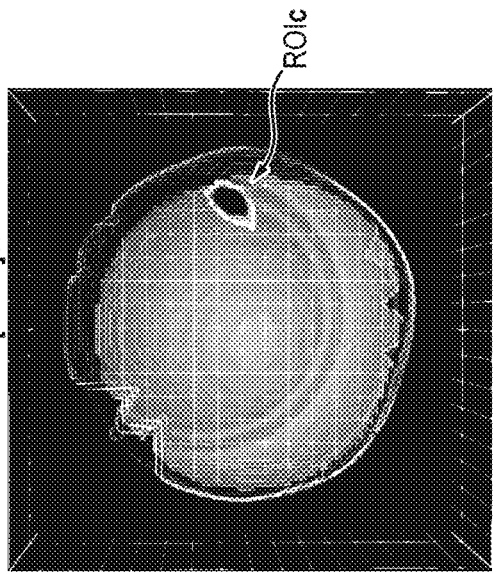

FIG. 1 shows a microwave medical imaging device 1 comprising an examination table 11 on which a patient 12 lies. In particular, the patient 12 lies in the prone position. The examination table 11 comprises an opening 13 that is preferably circular, enabling immersion of the patient's breast 14 in a vessel 15 filled with a biocompatible transition liquid, the dielectric properties of which are optimised in order to improve the transmission of electromagnetic waves into the breast.

An array 16 of microwave emission/receiving probes 161 (hereafter represented by hyphens) is disposed around of the vessel 15 and enables the observed medium to be illuminated in emission mode, and the signals reflected from the scene to be imaged to be received in receiving mode. The probes 161 are advantageously regularly distributed around the vessel and preferably in a ring surrounding the vessel as illustrated in FIG. 1. Advantageously, the probes are configured to emit signals in the 0.5-6 GHz frequency band.

More generally, the imaging system operates in a multistatic manner and enables the medium to be imaged to be illuminated by using several emission probes and several receiving probes and with various configurations around the medium to be imaged. The probes can be configured in a complementary manner in order to simultaneously emit and receive.

At each multistatic acquisition, all or part of the medium to be imaged is successively illuminated by preselected probes which operate in emission mode. The probes in emission mode of the array and their number are chosen according to the zone of the breast to be imaged. For each probe which emits, the signal is received by preselected probes which operate in receiving mode. The probes in receiving mode of the array and their number are chosen according to the zone of the breast to be imaged. It is then considered that each multistatic acquisition corresponds to a series of emissions/receptions of signals by the probes according to a determined configuration.

Here, configuration shall mean the definition of a set of emission probes and the definition of a set of receiving probes enabling a multistatic acquisition to be carried out, of all or part of the breast, these probes being disposed in a certain manner in the space around the breast.

In order to switch from one configuration to another and to control the various multistatic acquisitions, the system comprises a driving unit 17 of the array of probes which is connected to a control and processing unit 18 (for example a processor and/or a computer). Such a control and processing unit 18 is configured to drive the array, carry out the acquisitions, ensure storage of the acquired data, carry out image processing and implement an image processing method which will be described below. A storage unit 19 stores the set of acquired multistatic data and a certain number of data which can be used for the image processing steps or produced by the image processing. In addition, a display unit 20 can display and visualise the images obtained. The control and processing unit 18, the storage unit 19 and the display unit 20 can be directly incorporated in the imaging apparatus or else be physically offset. The image processing can be carried out a posteriori (off-line).

As will be understood, in order to image the entire breast, several successive configurations of emission probes and receiving probes are defined. These configurations of emission probes and receiving probes cover the various zones of the breast to be imaged and are chosen so as to ultimately encompass the entire breast to be imaged.

From the multistatic acquisitions of coefficients of transmission between the emission probes and the receiving probes carried out for the various configurations, 2D or 3D microwave images of the breast are obtained.

The following publications can be referred to for the processing of the multistatic emission/reception signals enabling the reconstruction of the 2D or 3D microwave images:

Fear, E.C.; Li, X.; Hagness, S.C.; Stuchly, M.A. Confocal microwave imaging for breast cancer detection: Localization of tumours in three dimensions. IEEE Trans. Biomed. Eng. 2002, 49, 812-822.

-E.J. Bond, X. Li, S.C. Hagness, B.D. Van Veen, Microwave imaging via space-time beamforming for early detection of breast cancer, IEEE Trans. Antennas Propag. 51 (2003). doi:10.1109/TAP.2003.815446.

Grzegorczyk, T.M.; Meaney, P.M.; Kaufman, P.A.; Paulsen, K.D. Fast 3-D tomographic microwave imaging for breast cancer detection. IEEE Trans. Med. Imaging 2012, 31, 1584-1592

A. Fasoula, B.M. Moloney, L. Duchesne, J.D.G. Cano, B.L. Oliveira, J. Bernard, M.J. Kerin, Super-resolution radar imaging for breast cancer detection with microwaves: the integrated information selection criteria, in: 41st Annu. Int. Conf. IEEE Eng. Med. Biol. Soc., 2019.

The microwave images obtained by means of the device 1 are advantageously used in the context of a processing method which will be described below. Such a method is advantageously implemented in a processing unit of the medical imaging device 1.

One or more microwave images of a zone of a human organ, in particular a breast, are obtained by means of the above-described device (step E1). At this stage, one or more images of the zone to be imaged, called initial microwave images, are possessed.

From at least one initial microwave image, one or more regions of interest are identified, if they exist (step E2).

According to an embodiment, these regions of interest can be identified "by hand" by a practitioner on one or more initial microwave images (step E21).

According to another embodiment, these regions of interest, are advantageously identified by applying a morphological processing (step E22) on each initial microwave image. The result obtained is one or more so-called morphological microwave images containing zero, one or more identified regions of interest. It is specified that a region of interest is a region of the image that is suspect.

Such a morphological processing consists, in particular, in identifying the objects connected in the image by using a thresholding method and retaining as regions of interest the selected objects which correspond to a set of morphological characteristics, in particular, the volumetric size of the connected object, the degree of solidity of the connected object, the level of intensity inside the connected object, the level of contrast between the intensity inside the connected object and the intensity inside other connected objects potentially identified in the same image, etc. The use of a plurality of morphological microwave images makes it possible to confirm the identification of the regions of interest (step E23) but, of course, a single image can suffice for the subsequent processing; we will return to this.

The goal here is to identify the suspect regions of interest which require an investigation that is the subject of later steps. The later processing steps apply to at least one identified region of interest.

FIGS. 3a, 3b, 3c, 3d and 3e show five morphological images obtained from initial 3D microwave images in which the above morphological processing (step E22) has been applied and on which identified regions of interest ROIa, ROIb, ROIc, ROId, ROIe can be distinguished. The morphological images of FIGS. 3a, 3b, 3c, 3d and 3e are shown in the coronal view of the breast.

The challenge of the steps that will be described is to be able to discriminate malignant lesions from benign lesions on the basis of regions of interest which have been identified in the images of the imaged zone.

In a complementary manner, the contour of each region of interest present in an image is refined with the goal of making it correspond better to the physical contour of the lesion (step E3). In order to refine the contour of each region of interest, a so-called 'active' segmentation is applied. For this purpose, reference can be made, for example, to the document by T.F. Chan, L.A. Vese, Active contours without edges, IEEE Trans. Image Process. (2001). doi:10.1109/83.902291.

For each region of interest, a limited number of characteristics are extracted (step E4), on the order of three to five, including in particular:
    a characteristic related to the shape: the solidity (step E41);
    at least two characteristics relating to the texture: the correlation (step E42) and the busyness (step E43).

The characteristic referred to as solidity (step E41) measures the density, or the convexity, of an object. In particular, the solidity is calculated as the ratio between the volume of the object and the volume of the convex envelope of the object. In general, the more the solidity of a region of interest approaches its maximum value of 100%, the more this region of interest has a regular, well-defined and convex contour, and the more it will have a high probability of corresponding to a benign lesion. This concept of regular contour of a solid mass corresponding to benign lesions is, for example, explained in the following publications:
    T.F. de Brito Silva, A.C. de Paiva, A.C. Silva, G. Braz Júnior, J.D.S. de Almeida, Classification of breast masses in mammograms using geometric and topological feature maps and shape distribution, Res. Biomed. Eng. (2020). doi:10.1007/s42600-020-00063-x.
    N. Safdarian, M. Hedyezadeh, Detection and Classification of Breast Cancer in Mammography Images Using Pattern Recognition Methods, Multidiscip. Cancer Investig. (2019). doi:10.30699/acadpub.mci.3.4.13.

Other characteristics connected to the various shapes of the solidity, for example the convexity, the eccentricity, compactness, etc. can also be used to discriminate irregular shapes. For this purpose, reference can be made to the document D.A. Khusna, H.A. Nugroho, I. Soesanti, Analysis of shape features for lesion classification in breast ultrasound images, in: AIP Conf. Proc., 2016. Doi:10.1063/1.4958602.

The so-called correlation characteristic (step E42) is obtained by a statistical treatment of the intensity of the region of interest belonging to the family known by the name Grey-Level Co-occurrence Matrix (GLCM)). Such processing makes it possible to obtain information on the texture of the region of interest and measure the spatial relation between the intensity of pixels in specific directions in order to highlight the properties of uniformity, homogeneity, random character and linear dependence of the intensity of the processed region of interest. Such a processing is described, in particular, in documents:
    R.M. Haralick, I. Dinstein, K. Shanmugam, Textural Features for Image Classification, IEEE Trans. Syst. Man Cybern. (1973). doi:10.1109/TSMC.1973.4309314.
    M. Vallières, C.R. Freeman, S.R. Skamene, I. El Naqa, A radiomics model from joint FDG-PET and MRI texture features for the prediction of lung metastases in soft-tissue sarcomas of the extremities, Phys. Med. Biol. (2015). doi:10.1088/0031-9155/60/14/5471.

Other characteristics of the GLCM family, for example the contrast, the dissimilarity, etc., can also be used.

The characteristic referred to as busyness (step E43) is obtained by a statistical treatment of the intensity of the region of interest belonging to the family known by the name of Neighbourhood Grey Tone Difference Matrix (NGTDM)). Such a treatment provides information on the texture of the region of interest and measures the spatial relationship between three or more neighbourhoods of pixels, closely approximating the human perception of the image of the processed region. In a manner that is complementary to the correlation, the characteristic of busyness can also be connected to the heterogeneity of the region of interest, knowing that the more heterogeneous the region of interest, the larger the probability of it corresponding to a malignant lesion. Such a processing is described, in particular, in documents:
    M. Amadasun, R. King, Textural Features Corresponding to Textural Properties, IEEE Trans. Syst. Man Cybern. (1989). doi:10.1109/21.44046.
    V. Parekh, M.A. Jacobs, Radiomics: a new application from established techniques, Expert Rev. Precis. Med. Drug Dev. (2016). doi:10.1080/23808993.2016.1164013.

Other characteristics of the NGTDM family, for example the coarseness, the complexity, etc., can also be used.

It is the combination of at least these three characteristics (solidity, correlation, busyness) which advantageously makes it possible to determine whether the region of interest has a larger probability of correspondence with a benign lesion or a malignant lesion. The physical reasoning behind the selection of these specific three characteristics of shape and texture, in order to differentiate between benign lesions and malignant lesions, identified from initial microwave images, is the following:

- differentiability in terms of higher solidity for the benign lesions such as simple cysts of regular shape example, as opposed to other suspect lesions;
- differentiability in terms of texture characteristics for the benign lesions such as fibroadenomas for example, as opposed to cancerous lesions having similar levels of solidity;
- values of correlation and busyness characteristics tending to be higher in the case of malignant lesions, with less uniform and more heterogeneous intensity diagrams, the two texture characteristics used having a complementary role in terms of identification of non-structured intensity models;
- high busyness values having a tendency to be associated with diagrams of highly heterogeneous lesions with rapid spatial variations, able to indicate distributed non-massive cancerous lesions, such as invasive lobular carcinomas for example.

These at least three characteristics (solidity, correlation, busyness) are extracted for each region of interest and can represent the regions of interest in an at least three-dimensional (3D) characteristics space (step E5).

In particular, in order to determine whether a region of interest is suspect, it is located in this 3D space (each dimension corresponding to each characteristic: solidity, correlation and busyness).

In particular, in this space, a 3D decision hypersurface is determined (step E6) by means of classifier models that are trained beforehand in the 3D characteristics space, using training data for which it is already known whether they correspond to regions of interest which are associated with malignant lesions or benign lesions.

Figure 4A:
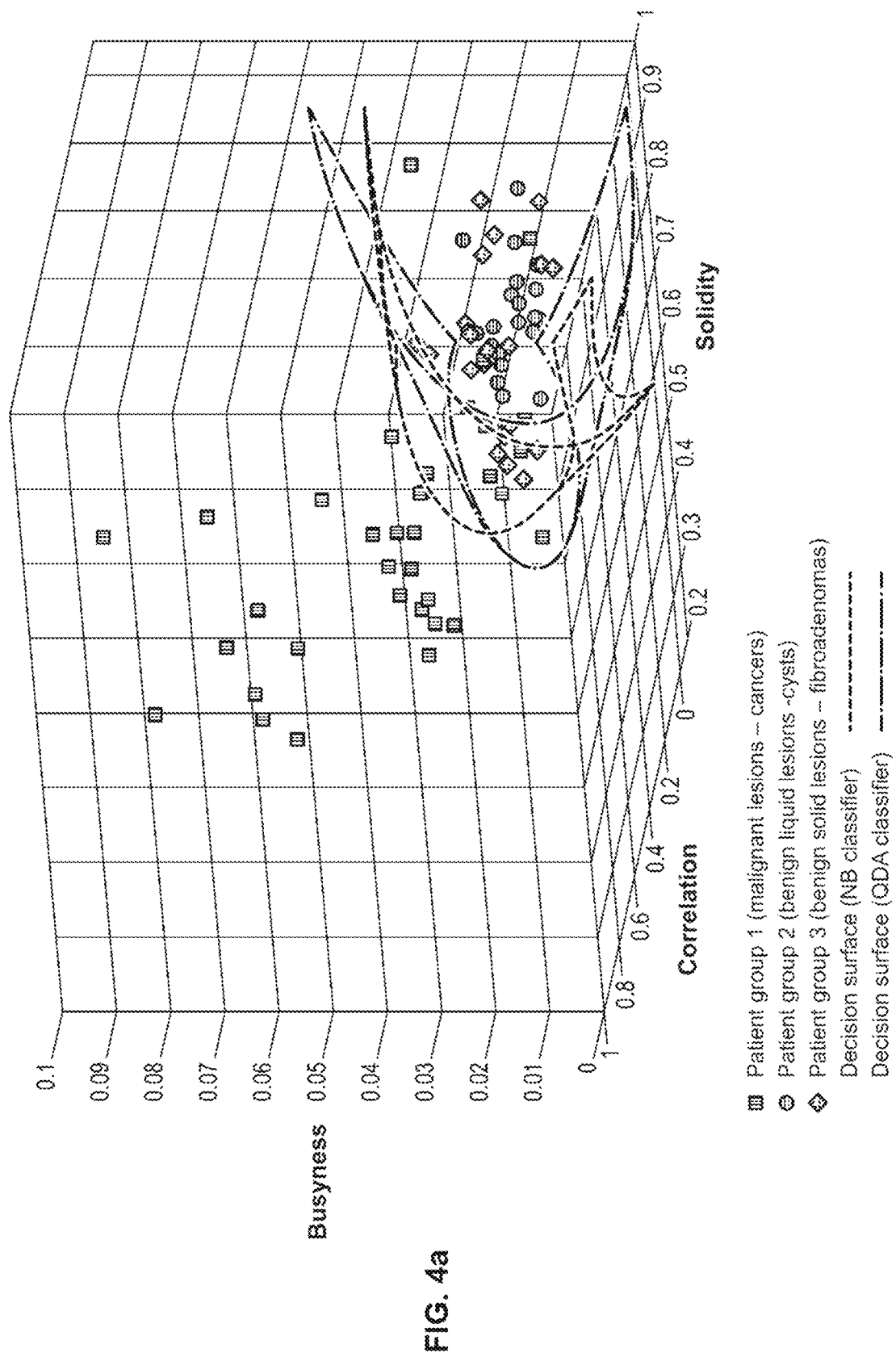
FIG. 4a, FIG. 4b, FIG. 4c and FIG. 4d show decision surfaces represented in a 3D space according to the invention.
Figure 4B:
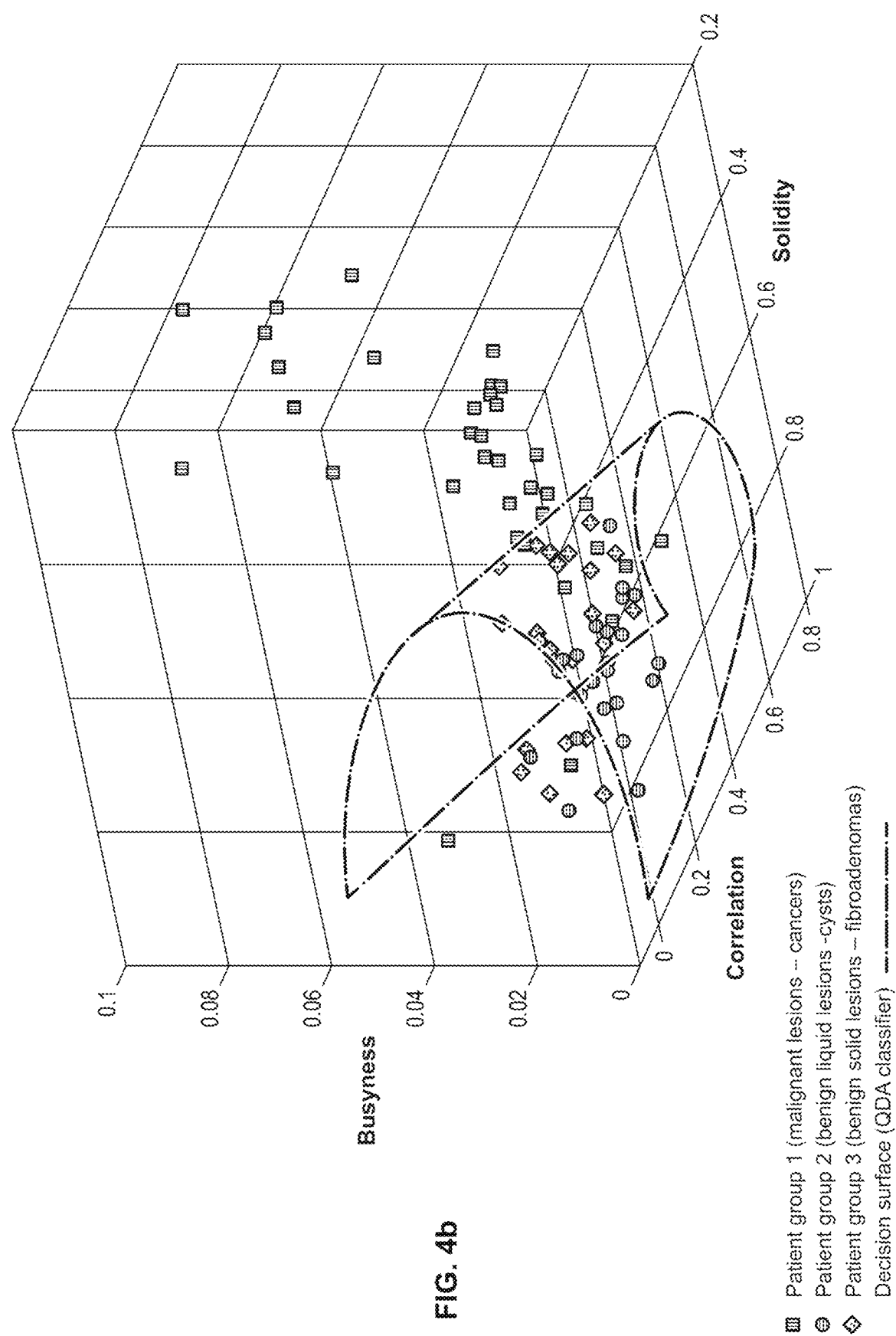
Figure 4C:
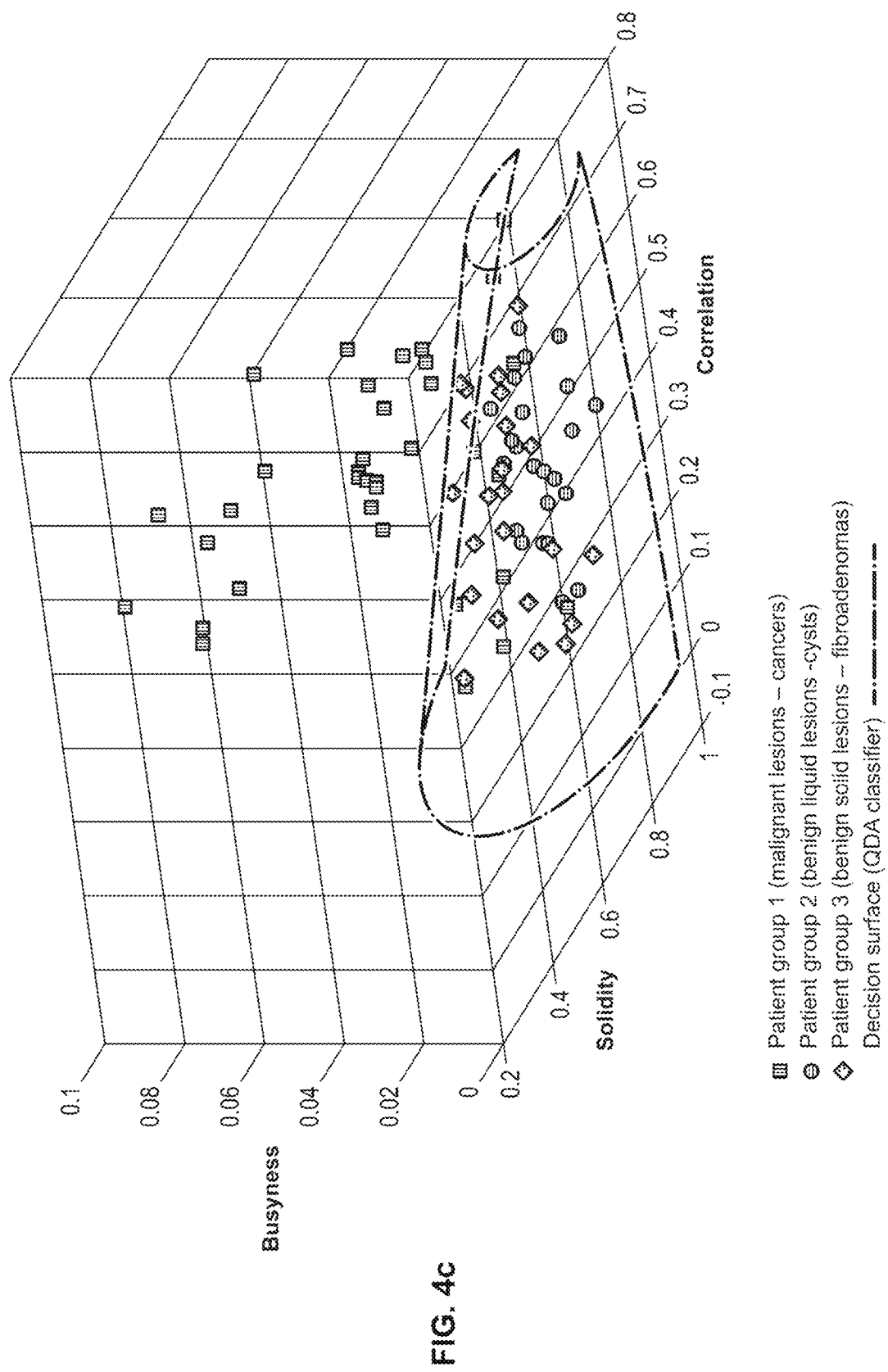

Advantageously, a naive Bayes classifier (NB) or a quadratic discriminant analysis classifier (QDA) is used and is trained in the 3D characteristics space. These classifiers are selected such that their decision hypersurface partitions the 3D space into two continuous and separate spaces. One subspace corresponds to benign lesions: a region of interest located in such a subspace will therefore be considered as associated with a benign lesion. The second subspace corresponds to malignant lesions: a region of interest located in such a subspace will therefore be considered as associated with a malignant lesion. FIG. 4*a* shows the decision surfaces for each of these two classifiers. FIGS. 4*b* and 4*c* show the decision surface of the quadratic discriminant analysis classifier (QDA) viewed from various angles (for various placements of the correlation and solidity axes). The training data for a plurality of groups of patients is also shown in these figures.

Depending on the location and the distance of the region of interest with respect to the decision surface in the 3D characteristics space, a classification score is calculated (step E7) which corresponds to a so-called malignancy probability. This malignancy probability is the probability, a posteriori, that the region of interest belongs to the class of malignant lesions. This malignancy probability is equal to 50% for a region of interest located on the decision surface. In the case of a region of interest located in the subspace corresponding to benign lesions, the further this region of interest is away from the decision surface, the lower will be its malignancy probability. In the case of a region of interest located in the subspace corresponding to malignant lesions, the further this region of interest is away from the decision surface, the higher will be its malignancy probability. When the malignancy probability is less than 50%, then the region of interest is associated with a benign lesion. When this malignancy probability is greater than 50%, then the region of interest is associated with a malignant lesion.

Figure 4D:
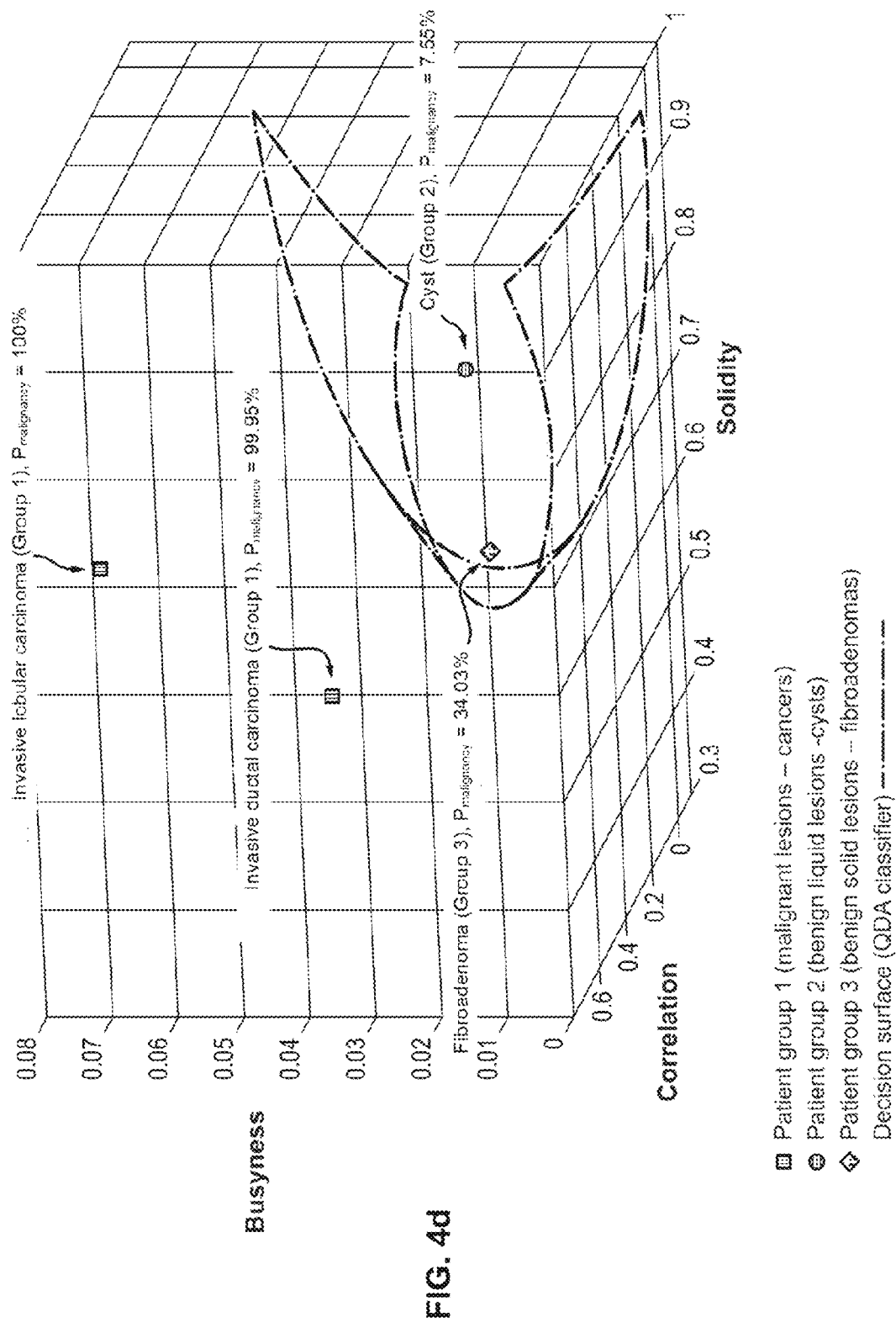

FIG. 4*d* shows the scores for regions of interest corresponding to a plurality of types of lesions in various patients. This figure shows a clear differentiability of the simple benign cyst (group 2) in terms of higher solidity. The benign fibroadenoma (group 3) and the two malign cancerous lesions (group 1) have similar levels of solidity, however a clear distinction is made between this benign lesion and these two malignant lesions in terms of texture characteristics, the values of correlation and busyness increase in the case of two malignant lesions, the increase being more notable with regard to busyness. In particular, a significant busyness value is associated with more heterogeneous types of lesions, which can be connected to more distributed shapes such as invasive lobular carcinomas (group 1).

Validation Based on a Persistence Criterion of at Least One Region of Interest That is Identified Beforehand From Microwave Radar Images A particular embodiment is described here for morphologically validating regions of interest, identified beforehand in microwave radar images.

In particular, here it involves obtaining, at the end of step E1, a plurality of microwave radar images of the imaged zone of the body.

The acquisition in step E1 is implemented for P>1 configurations of the array of probes, so as to be able to encompass the entire breast to be imaged and to subsequently reconstruct a 3D radar image of the breast.

In particular, for each configuration, a multistatic acquisition of transmission coefficients measured between the emitting probes and the receiving probes is performed. A plurality of multistatic acquisitions is then available (P>1 multistatic acquisitions).

Then, the signals acquired for each configuration are processed in order to obtain elementary microwave radar images for each of the configurations.

In particular, in order to process these signals, it is necessary to consider several sets (N>1 sets) of Ai values (Ai>1 values, with 1≤i≤N) of a pcfib parameter.

There are therefore $\Sigma_{i=1}^{N} Ai$ values of pcfib parameters per configuration. Hence, from the signals of each multistatic acquisition, $\Sigma_{i=1}^{N} Ai$, elementary microwave radar images are obtained, each having been obtained for one value of the pcfib parameter. The idea here is to obtain elementary images according to various hypotheses on the medium passed through by the electromagnetic waves.

Indeed, it is specified that such a pcfib parameter corresponds to a hypothesis on the average constitution of the medium passed through by the electromagnetic wave in the breast (or, more generally, the imaged zone) in terms of dielectric permittivity. This pcfib parameter corresponds to a percentage of mixture of fibro-glandular tissues and adipose tissues of the breast. For example, pcfib=30% corresponds to a medium containing 30% fibro-glandular tissues and 70% adipose tissues. The dielectric properties of mammary tissue are then defined as a weighted average (weighted by pcfib) of the dielectric properties of the fibro-glandular tissues and adipose tissues. For examples of dielectric permittivity values of fibro-glandular tissues and adipose tissues of the breast, reference can be made, for example, to the following publications:

- T. Sugitani, S.I. Kubota, S.I. Kuroki, K. Sogo, K. Arihiro, M. Okada, T. Kadoya, M. Hide, M. Oda, T. Kikkawa, Complex permittivities of breast tumor tissues obtained from cancer surgeries, Appl. Phys. Lett. (2014). doi: 10.1063/1.4885087;
- M. Lazebnik, L. McCartney, D. Popovic, C.B. Watkins, M.J. Lindstrom, J. Harter, S. Sewall, A. Magliocco, J.H. Booske, M. Okoniewski, S.C. Hagness, A large-scale study of the ultrawideband microwave dielectric properties of normal breast tissue obtained from reduction surgeries, Phys. Med. Biol. (2007). Doi:10.1088/0031-9155/52/10/001.

Advantageously, the sets of values of the pcfib parameter overlap totally or partially in terms of variation and/or in terms of values.

For example, there can be one set comprising the values 10%, 20% and another set comprising the values 5%, 15%, 25%. In this example, there is one set for which the values vary between 10% and 20% and another set for which the values vary between 5% and 25%. These two sets therefore have a common range of variation between 10% and 20%.

In another example, there can be one set comprising the values 10%, 20% and another set comprising the values 20%, 25%, 30%. In this example, the sets have one value in common, 20%.

In yet another example, there can be one set comprising the values 10%, 20%, 25% and another set comprising the values 5%, 10%, 30%. In this example, these two sets have a common range of variation between 10% and 25% and one common value, 10%.

At least two sets of values of the pcfib parameter are considered, for which one set can have a range of variation of values of the pcfib parameter broader than the range of variation of the other set. Here, the terms broad and narrow are relative terms which are understood by comparing the ranges of variation. The idea here is to have overlaps between the sets of values.

The choice of ranges of variation of the pcfib parameter for the various sets is made in connection with the existing variability in terms of compositions and density of the breasts.

Advantageously, broad ranges of variation lead to images comprising a more complete representation of the region of interest and narrow ranges of variation potentially lead to partial representations of the detectable lesions.

For example, in the context of breast imaging it is possible to choose N=5 sets of variation:
- three sets with narrow ranges of variation:
  - between 10% and 20%, the pcfib parameter taking, for example, the following values in this range: 10%, 15%, 20%
  - between 30% and 40%, the pcfib parameter taking, for example, the following values in this range: 30%, 35%, 40%
  - between 50% and 60%, the pcfib parameter taking, for example, the following values in this range: 50%, 55%, 60%
- two sets with broad ranges of variation:
  - between 20% and 50%, the pcfib parameter taking, for example, the following values in this range: 20%, 25%, 30%, 35%, 40%, 45%, 50%
  - between 10% and 60%, the pcfib parameter taking, for example, the following values in this range: 10%, 15%, 20%, 25%, 30%, 35%, 40%, 45%, 50%, 55%, 60%

For each configuration, an elementary microwave radar image is selected for each set and corresponds to one of the values of the parameter (pcfib) of the set; for each configuration, one elementary image per set is therefore selected. In the preceding example, there are five elementary images per configuration (one elementary image per set) which will be used for the reconstruction.

Such a selection consists, in particular, in using image focusing metrics such as, for example, the metrics described in the following documents:
- S. Pertuz, D. Puig, M.A. Garcia, Analysis of focus measure operators for shape-from-focus, Pattern Recognit. (2013). doi:10.1016/j.patcog.2012.11.011.
- O'loughlin, D.; Krewer, F.; Glavin, M.; Jones, E.; O'halloran, M. Focal quality metrics for the objective evaluation of confocal microwave images. Int. J. Microw. Wirel. Technol. 2017, 9, 1365-1372. Doi: 10.1017/S1759078717000642.

It is noted that from one configuration to the other, the selection of the elementary image for the same set can have been carried out with different values of the pcfib parameter belonging to this set.

From the elementary images obtained for the various configurations, a 2D or 3D radar image of the imaged zone is reconstructed for each of the sets. Hence, there is one reconstructed radar image per set of values of pcfib. Hence, at this stage, there is a plurality of initial images, one per set of values of pcfib.

In each microwave radar image thus constructed of the imaged zone, a morphological processing is applied so as to detect regions of interest, if they exist (see step E22 above).

The result obtained is a so-called morphological microwave image containing zero, one or a plurality of identified regions of interest. At this stage there are a plurality of morphological images of the breast, each morphological image being obtained per set of values of pcfib; each morphological image containing zero, one or a plurality of identified regions of interest.

Preferably, the morphological processing is based on the solidity criterion (see definition above). In practice, the solidity of a region of interest must exceed a given level in order that this region of interest can be identified in a morphological image of a given set.

Then, the persistence of each previously identified region of interest is evaluated in the various morphological images (step E23). The objective is to morphologically validate the regions of interest which are persistent for a plurality of hypotheses over the medium passed through by the electromagnetic waves. Evaluation of the persistence means the fact of having, over a plurality of morphological images, the presence of a region of interest located in 3D in the same zone. Here, it will be evaluated whether regions of interest identified by the morphological processing are located over a plurality of images in a same zone. Such an evaluation consists, in particular, in using criteria such as, for example, spatial clustering, in order to associate the detected regions of interest with one another.

The persistence then makes it possible to morphologically validate identified regions of interest, in other words their association with physical objects if these regions of interest are present in a determined proportion of the number of morphological images.

Persistence therefore makes it possible to validate previously identified regions of interest using a plurality of morphological images. The previously identified regions of interest on the morphological images and which have been validated by means of the persistence, then being used to implement the subsequent processing steps.

Then, previously described steps E3 to E7 are applied to the previously identified regions of interest which have been validated by means of the persistence.

The invention claimed is:

1. A method for processing microwave medical images of human tissues of a zone of the body of a patient and in particular of the breast, implemented by computer and comprising the following steps:
   identifying at least one region of interest from at least one initial microwave image of a zone of the body of a patient;
   processing each region of interest identified in an image of the at least one microwave image for determining only three to five characteristics relating to the region of interest, the only three to five characteristics including:
   at least a first shape characteristic, including one relating to the solidity of each region of interest; and
   at least a second and third characteristic relating to the texture of each region of interest, two of which being the correlation and the busyness; the first, second and third characteristics being coordinates characterising each region of interest;
   locating, in a space of at least three dimensions, the dimensions of which are at least the first, second and third characteristic, respectively, of each region of interest based on its coordinates, the space being partitioned by a decision hypersurface into two continuous and separate sub-spaces, one sub-space such that a region of interest located therein is associated with a benign lesion, and another sub-space such that a region of interest located therein is associated with a malignant lesion.

2. The method as claimed in claim 1, comprising determining a classification score for each region of interest, said score corresponding to a probability of malignancy being the probability, a posteriori, of the region of interest belonging to the class of malignant lesions.

3. The method as claimed in claim 2, wherein a region of interest is associated with a benign lesion if the probability of malignancy is less than or equal to 50% and is associated with a malignant lesion if the probability of malignancy is greater than 50%.

4. The method as claimed in claim 1, wherein the second characteristic is a measurement of the spatial relationship between the intensity of the pixels of the region of interest in specific directions.

5. The method as claimed in claim 1, wherein the third characteristic is a measurement of the spatial relationship between the intensity of three or more groups of neighbouring pixels of the region of interest.

6. The method as claimed in claim 1, wherein a decision surface is obtained by means of a naive Bayes classifier or by means of a quadratic discriminant analysis classifier, trained beforehand on training regions of interest.

7. The method as claimed in claim 1, comprising a processing step of each region of interest for refining the contour of each region of interest.

8. The method as claimed in claim 1, comprising a step of obtaining at least one initial image of the zone to be imaged and a step of morphological processing of each initial image in order to identify the regions of interest.

9. The method as claimed in claim 1, comprising a step of validating the regions of interest by evaluating the persistence of the regions of interest over a plurality of morphological images.

10. A medical imaging device comprising a processing unit configured for implementing a method as claimed in claim 1.

* * * * *